(12) United States Patent
Tachiwa (10) Patent No.: US 10,079,516 B2
(45) Date of Patent: Sep. 18, 2018

(54) POWER TRANSMISSION APPARATUS, METHOD FOR CONTROLLING THE SAME, AND PROGRAM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 14/961,611

(22) Filed: Dec. 7, 2015

(65) Prior Publication Data

US 2016/0164306 A1 Jun. 9, 2016

(30) Foreign Application Priority Data

Dec. 9, 2014 (JP) .................................. 2014-249444

(51) Int. Cl.
*H02J 50/10* (2016.01)
*H02J 50/80* (2016.01)

(52) U.S. Cl.
CPC .............. *H02J 50/80* (2016.02); *H02J 50/10* (2016.02)

(58) Field of Classification Search
CPC .... H02J 5/00; H02J 5/005; H02J 17/00; H02J 50/10; H02J 50/60; H02J 50/80; H02J 50/90; H04B 5/0037
See application file for complete search history.

(56) References Cited

U.S. PATENT DOCUMENTS

| | | | | |
|---|---|---|---|---|
| 9,306,636 B2* | 4/2016 | Kwon | ..................... | H02J 50/60 |
| 9,537,352 B2* | 1/2017 | Lee | ......................... | H02J 17/00 |
| 9,722,446 B2* | 8/2017 | Kwon | ..................... | H02J 7/007 |
| 9,768,637 B2* | 9/2017 | Kwon | ..................... | H02J 7/025 |
| 9,800,061 B2* | 10/2017 | Takahashi | ............... | H02J 5/005 |
| 2014/0009110 A1* | 1/2014 | Lee | ......................... | H02J 7/025 320/108 |
| 2016/0141886 A1* | 5/2016 | Eguchi | .................... | H02J 5/005 307/104 |

FOREIGN PATENT DOCUMENTS

| | | |
|---|---|---|
| JP | 2013-106427 A | 5/2013 |
| JP | 2013-172472 A | 9/2013 |
| JP | 2013-172473 A | 9/2013 |
| JP | 2013-212004 A | 10/2013 |

* cited by examiner

*Primary Examiner* — Patrick O'Neill
(74) *Attorney, Agent, or Firm* — Canon U.S.A., Inc. IP Division (57) ABSTRACT

A power transmission apparatus includes a power transmission unit configured to wirelessly transmit power to a power reception apparatus, a detection unit configured to detect an object present in a range of the power transmission apparatus where the power is transmitted based on an intermittent power transmission, and an authentication unit configured to authenticate whether the object detected by the detection unit is the power reception apparatus that receives the power, wherein the authentication unit authenticates the object detected as being present in the range where the power is transmitted at each of a plurality of times of the power transmission for detection during a predetermined period, and wherein the power transmission unit transmits the power to the power reception apparatus that has been successfully authenticated.

11 Claims, 8 Drawing Sheets

POWER TRANSMISSION APPARATUS, METHOD FOR CONTROLLING THE SAME, AND PROGRAM

BACKGROUND

Field

Aspects of the present invention generally relate to wireless power transmission.

Description of the Related Art

In the related art, a wireless power transmission system including a power transmission apparatus that wirelessly transmits power and a power reception apparatus that receives the power supplied from the power transmission apparatus are known. Typically, the power transmission apparatus detects a power reception apparatus present in a range where power is transmitted for the purpose of detection. Authentication processing is then performed with respect to the detected power reception apparatus based on power transmission for authentication. When the authentication succeeds, regular power transmission starts (refer to Japanese Patent Application Laid-Open No. 2013-212004).

Since the wireless power transmission system wirelessly transmits the power, the power can be transmitted to an object present in a relatively wide range of area. Thus, it is necessary to detect the object present in the range where the power is transmitted. Therefore, even when the power reception apparatus just passes through the vicinity of the power transmission apparatus, the power transmission apparatus may detect the power reception apparatus and the authentication processing may be initiated. As a result, the power transmission apparatus sometimes performs processing for unnecessary power transmission to a power reception apparatus that just passes through the vicinity of the power transmission apparatus and does not need to receive power.

SUMMARY

A power transmission apparatus includes a power transmission unit configured to wirelessly transmit power to a power reception apparatus, a detection unit configured to detect an object present in a range of the power transmission apparatus where the power is transmitted based on an intermittent power transmission, and an authentication unit configured to authenticate whether the object detected by the detection unit is the power reception apparatus that receives the power. The authentication unit authenticates the object detected as being present in the range where the power is transmitted at each of a plurality of times of the power transmission for detection during a predetermined period. The power transmission unit transmits the power to the power reception apparatus that has been successfully authenticated.

Further features of the present disclosure will become apparent from the following description of exemplary embodiments with reference to the attached drawings.

DESCRIPTION OF THE EMBODIMENTS

First Embodiment

Figure 1:
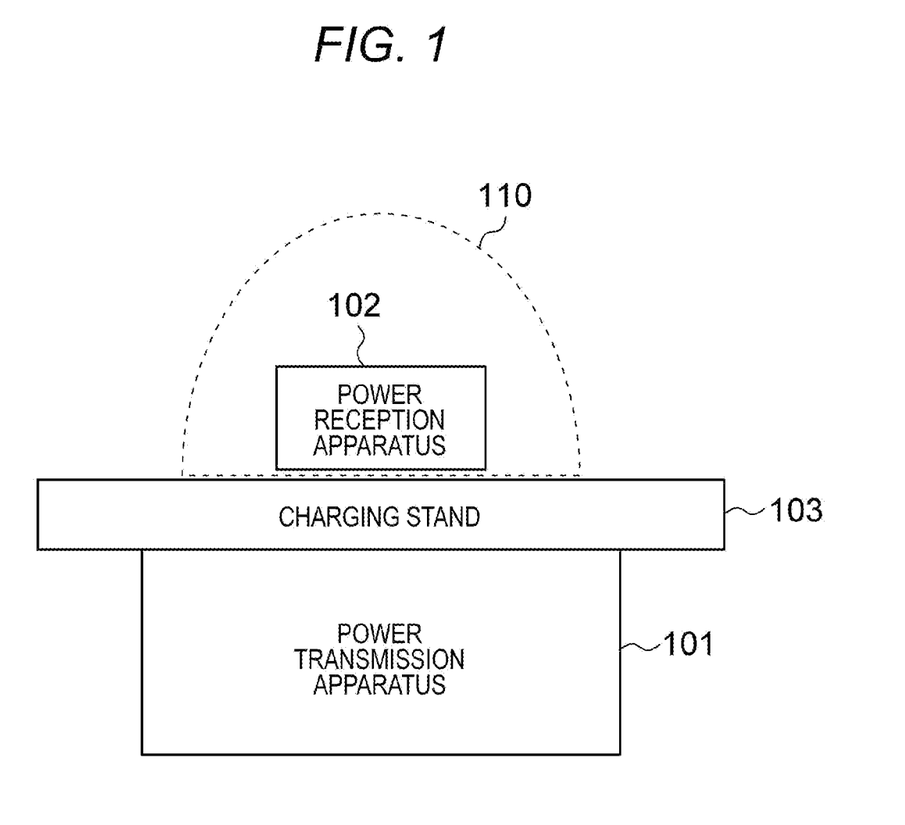
FIG. 1 is a diagram of a configuration of a wireless power transmission system.

FIG. 1 is a diagram of a configuration of a wireless power transmission system that performs wireless power transmission, according to the present embodiment. Note that the wireless power transmission system according to the present embodiment performs the wireless power transmission using a magnetic field resonance method. The magnetic field resonance method transmits power by a combination of magnetic field resonance (resonance) between a resonator (resonance element) of a power transmission apparatus and a resonator (resonance element) of a power reception apparatus. Note that, in the present embodiment, an exemplary wireless power transmission system using the magnetic field resonance method will be described. However, the wireless power transmission method (non-contact power transmission method) is not limited to the magnetic field resonance method. A power transmission method using, for example, electromagnetic induction, electric field resonance, a microwave, or a laser, may be used.

In FIG. 1, reference numerals 101 and 102 denote a power transmission apparatus and a power reception apparatus, respectively. The power transmission apparatus 101 wirelessly transmits power. The power reception apparatus 102 can receive the power wirelessly transmitted by the power transmission apparatus 101. The power reception apparatus 102 includes a battery. The battery is charged with the power received from the power transmission apparatus 101. Reference numeral 110 illustrates a range where the power by the power transmission apparatus 101 is transmitted. The wireless power transmission system according to the present embodiment performs communication for authentication and communicates control information for controlling the wireless power transmission between the power transmission apparatus and the power reception apparatus. Hereinafter, transmission and reception of the power between the power transmission apparatus and the power reception apparatus are expressed as power transmission, power reception, or power transmission (wireless power transmission). An exchange for the authentication and an exchange for the control information between the power transmission apparatus and the power reception apparatus are expressed as communication (wireless communication).

Communication that conforms to the Bluetooth® 4.0 standard is used between the power transmission apparatus and the power reception apparatus in the wireless power transmission system according to the present embodiment. Bluetooth® Low Energy (BLE) that can communicate with relatively low power consumption is defined in Bluetooth® 4.0. Note that, in the present wireless power transmission system, the power transmission apparatus serves as a central that is a master station of a network and is defined by the BLE. In order to simultaneously transmit power with respect to multiple power reception apparatuses, the power transmission apparatus needs to communicate with each power reception apparatus. In order to communicate with each power reception apparatus, the power transmission apparatus serves as the central. Each of the power reception apparatuses serves as a peripheral defined by the BLE. The peripheral is coupled to the central and communicates based on control by the central. However, note that the power transmission apparatus 101 may be the peripheral and the power reception apparatus 102 may be the central.

The communication performed in the present exemplary embodiment conforms to the BLE. However, the communication may conform to other communication standards, for example, a wireless LAN (The Institute of Electrical and Electronics Engineers, Inc (IEEE) 802.11 series). The communication according to the present embodiment may conform to near field communication (NFC) or ZIGBEE. The communication may conform to an original communication method, such as load modulation. Here, one power transmission apparatus and one power reception apparatus have been illustrated. However, two or more power transmission apparatuses and two or more power reception apparatuses may be provided.

Figure 2:
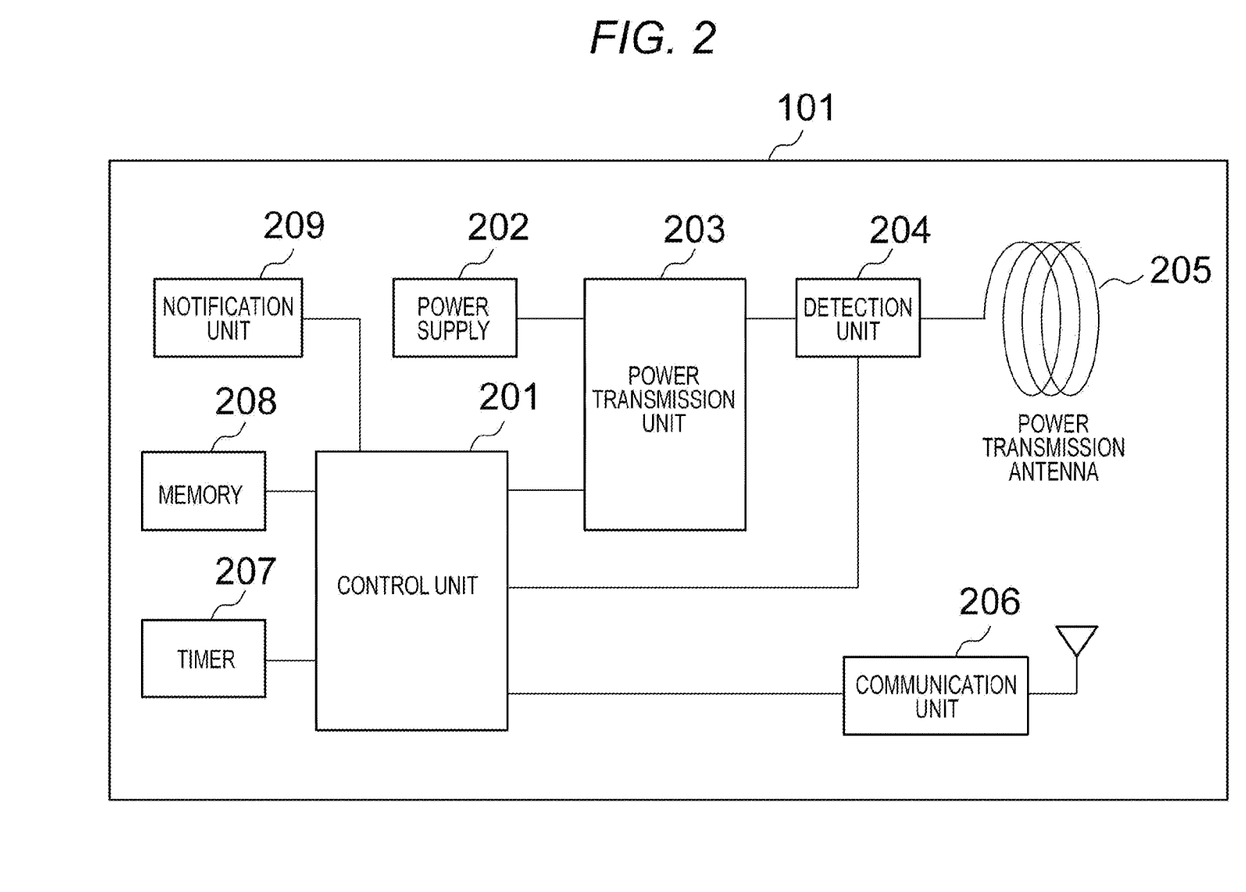
FIG. 2 is a diagram of a configuration of a power transmission apparatus.

Next, configurations of the respective apparatuses in the wireless power transmission system will be described. FIG. 2 is a diagram of a configuration of the power transmission apparatus 101 in the wireless power transmission system. Reference numeral 201 denotes a control unit that controls the power transmission apparatus 101. An example of the control unit 201 is a central processing unit (CPU) including a timer 207 and a memory 208. The control unit 201 executes a control program stored in the memory 208 to control the entire power transmission apparatus. When the control unit 201 stores a variable value while executing the control program, the control unit 201 also uses the memory 208. The control unit 201 uses the timer 207 when measuring time.

Reference numeral 202 denotes a power supply that supplies power when the power transmission apparatus 101 performs the wireless power transmission. The power supply 202 is a commercial power supply or a battery. Reference numeral 203 denotes a power transmission unit that converts direct current (DC) or alternating current (AC) power input from the power supply 202 into AC frequency power in a transmission band, and generates an electromagnetic wave that is sent through a power transmission antenna 205. Based on an instruction from the control unit 201, the power transmission unit 203 adjusts the intensity of the electromagnetic wave to output via the power transmission antenna 205, where the different intensities are used for power transmission for detection, power transmission for authentication, power transmission in a power transmission phase, etc. as described below. The power transmission unit 203 also performs control, based on an instruction from the control unit 201, to stop the power transmission from the power transmission antenna 205.

Reference numeral 204 denotes a detection unit that detects an input voltage to the power transmission antenna 205. The voltage detected by the detection unit 204 can be converted into power output from the power transmission antenna 205 to an object present in a range where the power is transmitted. The detection unit 204 can include a configuration that detects an input current value or an input power value to the power transmission antenna 205. The detection unit 204 can include a configuration that detects at least one of an input voltage value, an input current value, or an input power value from the power supply 202 to the power transmission unit 203.

The power transmission apparatus 101 can determine, based on a detection result detected by the detection unit 204, whether the object receiving the power output from the power transmission apparatus 101 has been placed on a charging stand 103 which is in the range 110. In a case where the object receiving the power is in the range 110, the object receives (consumes) part of the power output from the power transmission unit 203, and the detection unit 204 detects a value different from that in a stationary state. Stationary state refers to the object that receives the power not having been placed in the range 110.

Reference numeral 206 denotes a communication unit that communicates with the power reception apparatus 102. The communication unit 206 includes a chip for controlling wireless communication that conforms to the BLE, and an antenna for transmitting a signal. Reference numeral 209 denotes a notification unit that issues an information notification to a user. The notification unit 209 includes a function that displays, based on an instruction from the control unit 201, the information on a liquid crystal display (LCD) (not shown). The notification unit 209 may provide the notification information in another manner other than via the LCD. For example, the notification information may be provided via a speaker, where audio is used to provide the information notification to the user.

The power transmission apparatus 101 is not limited to just being an apparatus that transmits power. For example, it can be any type of apparatus, such as a printer, a personal computer, etc.

Next, a configuration of the power reception apparatus 102 in the wireless power transmission system will be described using FIG. 3. Reference numeral 301 is a control unit that controls the power reception apparatus 102. The control unit 301 is a CPU that includes a timer 307 and a memory 308 like the control unit 201. A communication unit 306 includes a chip for controlling the wireless communication that conforms to the BLE, and an antenna for transmitting a signal. Reference numeral 305 denotes a power reception antenna for receiving the wireless power transmission from the power transmission apparatus 101. Reference numeral 303 denotes a power reception unit that generates power from the electromagnetic wave received by the power reception antenna 305. The power reception unit 303 generates resonance due to the electromagnetic wave received by the power reception antenna 305, and obtains AC power due to the resonance. The power reception unit 303 then rectifies the AC power to a DC power or an AC power with a desired frequency to output the DC power or the AC power with the desired frequency. Reference numeral 302 denotes a rechargeable battery. The rechargeable battery 302 is charged with the power received by the power reception apparatus 102. Reference numeral 304 denotes a detection unit that detects a voltage across the battery 302. Based on the detected voltage, the control unit 301 detects whether the battery 302 has been fully charged and a charging state of the battery 302.

The control unit 301 and the communication unit 306 in the power reception apparatus 102 may operate with the power transmitted by the power transmission apparatus 101. With this configuration, even when the power reception apparatus 102 maintains no power necessary to start the wireless power transmission from the power transmission apparatus 101, the power reception apparatus 102 can start to communicate with the power transmission apparatus 101.

Examples of the power reception apparatus 102 may be an apparatus, such as a digital camera or a mobile phone, but are not limited to these types of apparatuses.

Figure 3:
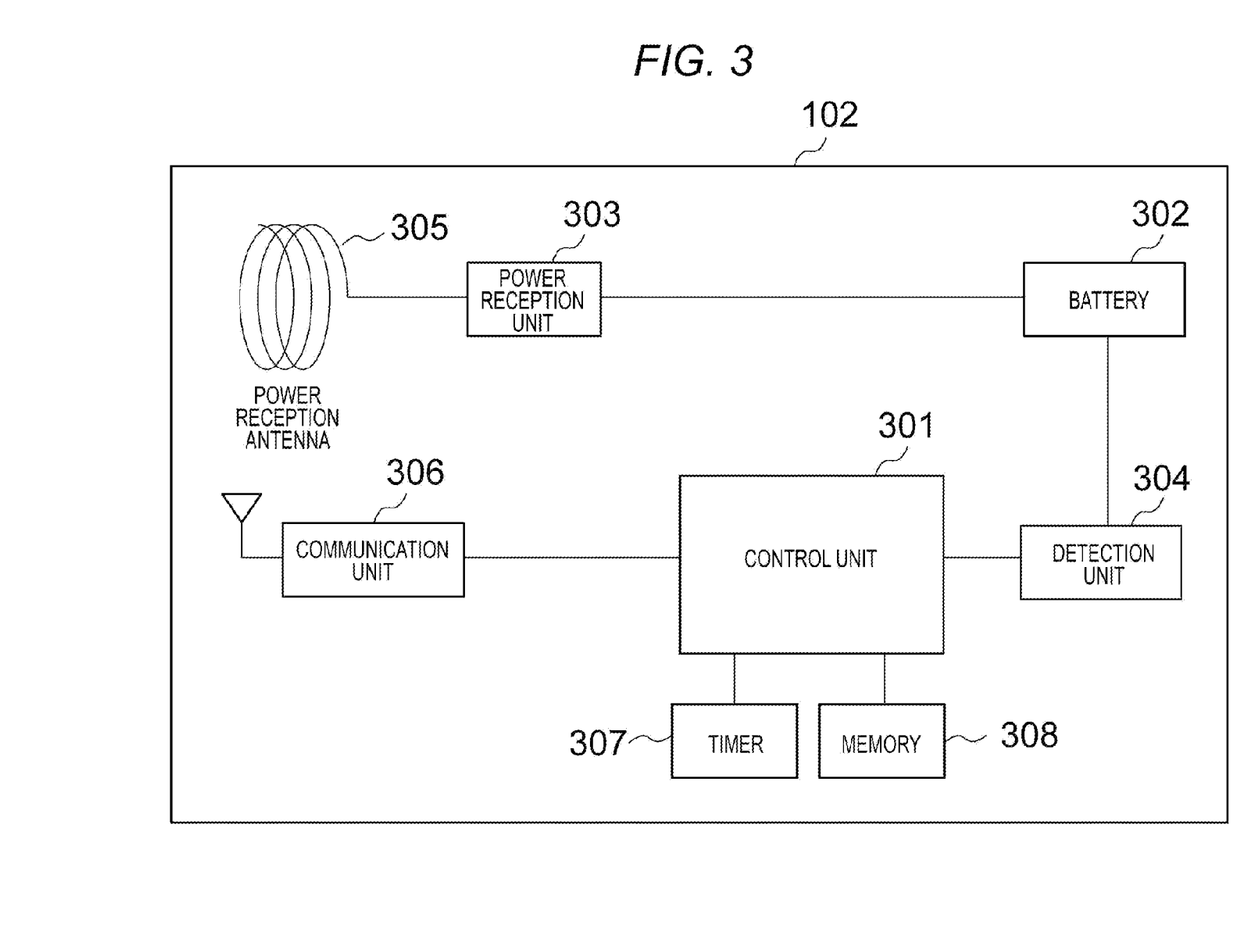
FIG. 3 is a diagram of a configuration of a power reception apparatus.

The configurations illustrated in FIGS. 2 and 3 are just examples. The power transmission apparatus 101 and the power reception apparatus 102 may include hardware configurations other than the illustrated hardware configurations. For example, both the power transmission apparatus 101 and the power reception apparatus 102 may include an operation unit requiring a user to perform various kinds of input to, for example, operate the apparatus.

An exchange between the power transmission apparatus 101 and the power reception apparatus 102 in the wireless power transmission having the above configurations includes three phases: a detection phase, a communication establishing phase, and a power transmission phase.

In the detection phase, the power transmission antenna 205 intermittently generates the electromagnetic wave so that power transmission for detecting the power reception apparatus 102 (power transmission for detection) is intermittently performed. When an object is placed in the range where the power is transmitted, of the power transmission apparatus 101 in a case where the power transmission for detection is performed in the detection phase, the power transmission for detection is supplied to the object. In this case, load impedance viewed from the side of the power transmission apparatus 101 varies. As a result, a distinctive change occurs in a voltage or a current in the power transmission apparatus 101. Therefore, detecting the change of the voltage or the current in the power transmission apparatus 101 results in detecting that the object has been placed in the range where the power is transmitted. When the power transmission apparatus 101 detects that there is the object in the range where the power is transmitted, power transmission for supplying power necessary for authentication processing (power transmission for authentication) starts with respect to the detected object. When the detected object is the power reception apparatus 102, a power value is substantially large for activating the control unit 301 and the communication unit 306 in the power reception apparatus 102. The power value of the power transmission for authentication is substantially larger than that of the power transmission for detection.

In the power reception apparatus 102 that has received the power transmission for authentication, the communication unit 306 transmits an advertising packet within a certain period, for example, 100 ms, after the power transmission for authentication. The advertising packet causes another apparatus to transmit a communication connection request. When receiving the advertising packet from the power reception apparatus 102 that has responded to the power transmission for authentication, the power transmission apparatus 101 determines that the power reception apparatus 102 is in the range where the power is transmitted.

The advertising packet is a signal to which broadcast transmission is performed and that is defined by the BLE. The advertising packet includes information, such as an apparatus name, a kind of service to be provided, and a version of a protocol used for the communication. The advertising packet is used to notify a peripheral apparatus of the presence and an indication for waiting for connection from the peripheral apparatus. The advertising packet from the power reception apparatus 102 includes service information indicating that the wireless power transmission method handled by the present system can be performed. In the following descriptions, the advertising packet is referred to as a notification signal.

When the power transmission apparatus 101 does not receive the notification signal from the power reception apparatus 102 within a predetermined period, for example, 100 ms, from a start of the power transmission for authentication, the power transmission apparatus 101 stops the power transmission for authentication. The power transmission antenna 205 intermittently generates the electromagnetic wave again so that the power transmission for detection is intermittently performed.

In the detection phase, when the power transmission apparatus 101 detects the notification signal from the power reception apparatus 102, the phase proceeds to the communication establishing phase. The power transmission apparatus 101 transmits, from the communication unit 206, a connection request packet (connection request) to the power reception apparatus 102 that is a transmission source of the notification signal received by the power transmission apparatus 101. Then, the power transmission apparatus 101 establishes communication connection with the power reception apparatus 102 in accordance with the transmitted connection request. Then, authentication processing is performed between the apparatuses using the established communication connection. The authentication processing communicates (exchanges) mutual capability information during a period of the communication connection established between the power transmission apparatus 101 and the power reception apparatus 102. The capability information includes, for example, an amount of the power that can be transmitted and received, a hardware configuration, a handling power transmission method, or a version of a handling power transmission standard. The BLE periodically generates a chance for exchanging a data packet. The chance is referred to as a connection event. The power transmission apparatus 101 requires, by the data packet to be transmitted at the first connection event, the power reception apparatus 102 to notify the power transmission apparatus 101 of a necessary power value. In order to satisfy the request, the power reception apparatus 102 includes the necessary power value in a next data packet and transmits the necessary power value.

In the authentication processing, when a version of a protocol of the power transmission apparatus 101 corresponds to that of the power reception apparatus 102, and when power required by the power reception apparatus 102 is substantially less than or equal to power the power transmission apparatus 101 can transmit, the authentication succeeds. Otherwise, the authentication fails. When information necessary for the authentication is not acquired from the power reception apparatus 102 within a predetermined time after the power transmission for authentication is started, the authentication also fails. In a case where the authentication processing communicates, between the power transmission apparatus 101 and the power reception apparatus 102, a password for performing the authentication, when either the power transmission apparatus 101 or the power reception apparatus 102 or both the power transmission apparatus 101 and the power reception apparatus 102 determine that the communicated password is correct, the authentication may succeed.

By the authentication processing, the power transmission apparatus 101 can confirm that the object present in the range where the power is transmitted is the power reception apparatus 102 requiring the power transmission. By the authentication processing, the power reception apparatus 102 can confirm whether the power transmission apparatus 101 to which the communication connection has been performed can supply the power. In the communication establishing phase, the power transmission apparatus 101 continuously performs the power transmission for authentication to perform the power transmission for performing communication of the capability information and communication necessary for the communication connection with respect to the power reception apparatus 102.

The power transmission apparatus 101 establishes the communication connection with the power reception apparatus 102 in the communication establishing phase. When the power transmission apparatus 101 and the power reception apparatus 102 exchange the capability information, the phase proceeds to the power transmission phase. In the power transmission phase, the power transmission apparatus 101 transmits, to the power reception apparatus 102, power substantially larger than those of the power transmission for detection in the detection phase and the power transmission for authentication in the communication establishing phase. In the power transmission phase, the power transmission apparatus 101 receives, by the communication unit 206, the control information for controlling the wireless power transmission, such as a value of the power that has been received, a request for increase or decrease of power transmission capacity, or a stop of the power transmission, from the power reception apparatus 102. That is, in the power transmission phase, the power transmission apparatus 101 performs power transmission corresponding to a request from the power reception apparatus 102. When the power transmission apparatus 101 receives, from the power reception apparatus 102, a signal that requires a stop of the power transmission or an error in the power transmission occurs, the power transmission phase is completed. The control information from the power reception apparatus 102 may include error information. For example, when receiving, from the power reception apparatus 102, control information indicating that an error such as heat generation of the battery occurs, the power transmission apparatus 101 may stop the power transmission. In the following descriptions, the power transmission in the power transmission phase is referred to as power transmission for charging.

Figure 4:
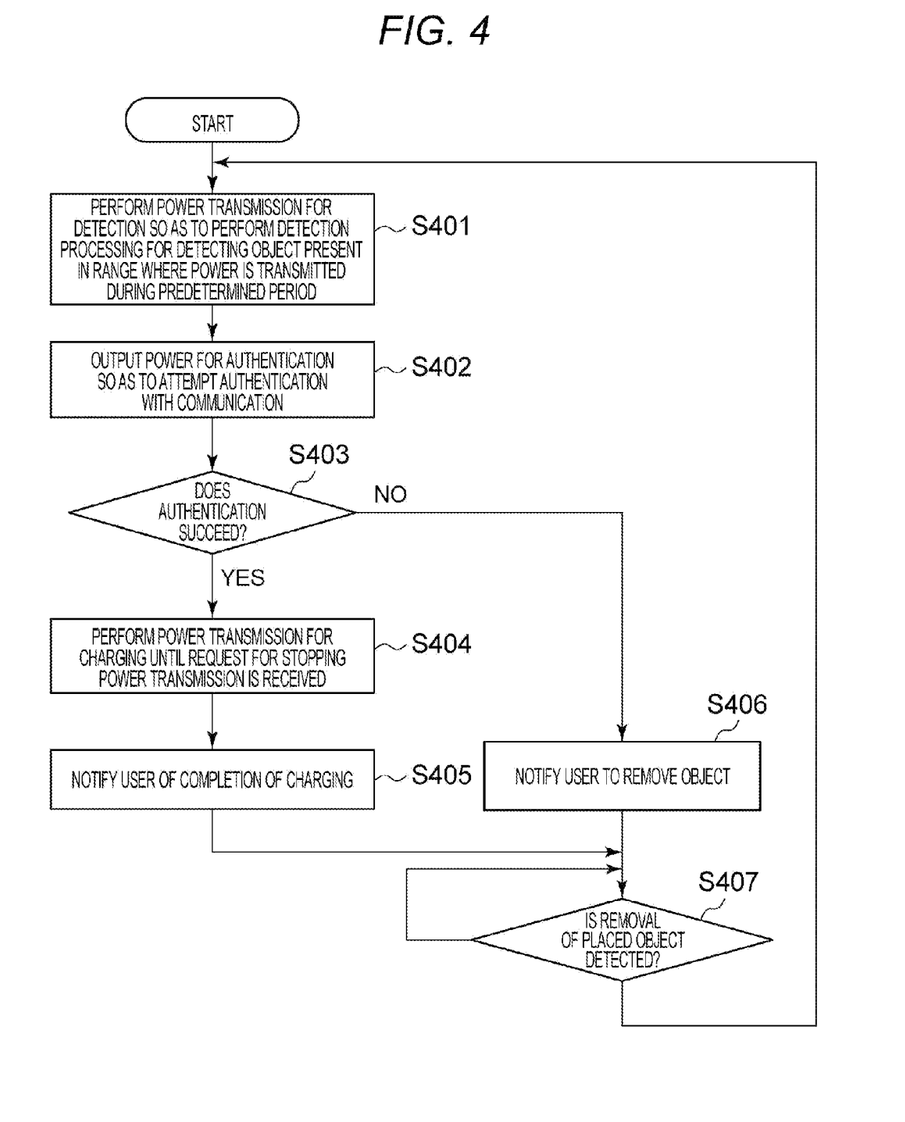
FIG. 4 is a flowchart of operation of the power transmission apparatus.
Figure 5:
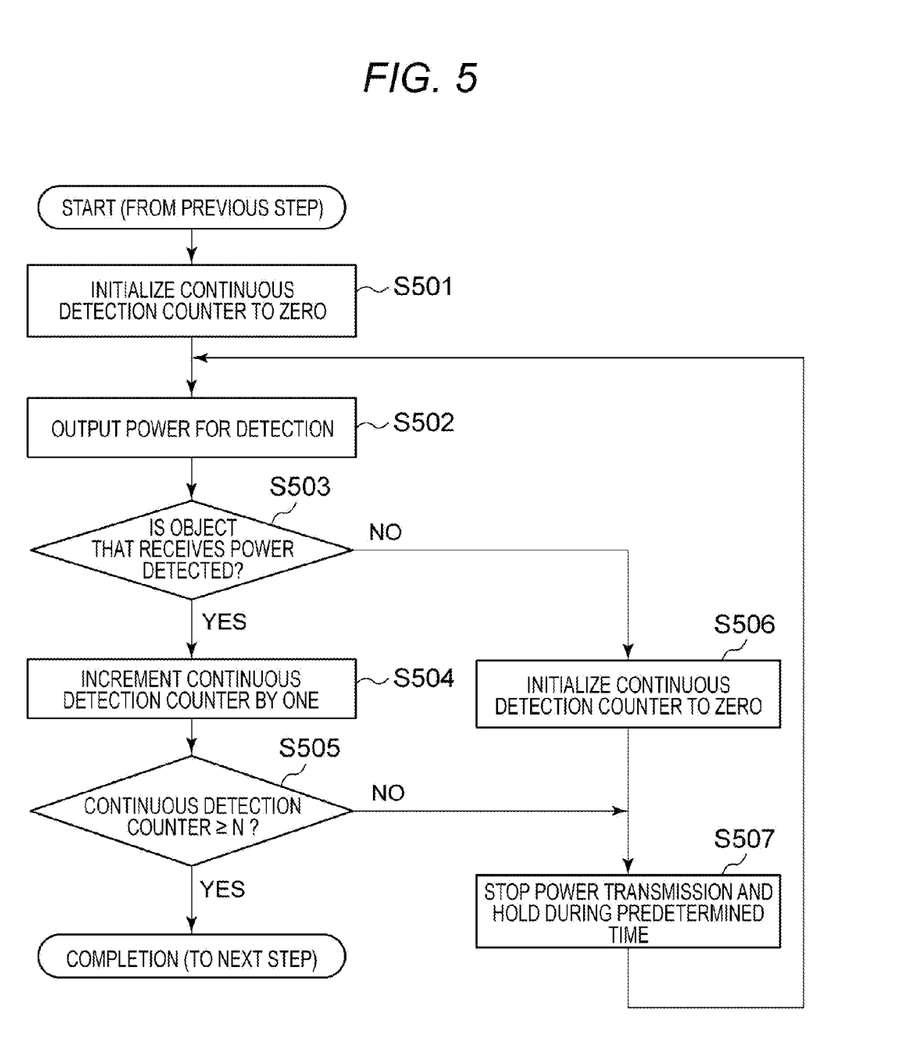
FIG. 5 is a flowchart of detection processing.

Operation of the wireless power transmission system that performs the wireless power transmission according to the present embodiment will be described using flowcharts illustrated in FIGS. 4 and 5. FIG. 4 is the flowchart of operation of the power transmission apparatus 101. FIG. 5 is the flowchart of detection processing. The control unit 201 executes the control program stored in the memory 208 to perform a calculation and processing of information and control of each of piece of hardware. As a result, the flowcharts illustrated in FIGS. 4 and 5 can be achieved. A part of the steps or the entire steps in the flowcharts illustrated in FIGS. 4 and 5 may be constituted of hardware, such as an application specific integrated circuit (ASIC).

Processing illustrated in FIG. 4 starts when power of the power transmission apparatus 101 is turned on. The processing illustrated in FIG. 4 is completed when the power of the power transmission apparatus 101 is turned off.

When starting operation, the control unit 201 controls the power transmission unit 203 so that the power transmission antenna 205 outputs the power transmission for detection. Then, the control unit 201 continuously performs, during a predetermined time or more, the detection processing for detecting the object present in the range 110 where power is transmitted on the charging stand 103 illustrated in FIG. 1 (S401). A detailed description of this processing will be given later.

When the detection processing detects the object, the control unit 201 controls the power transmission unit 203 so that the power transmission antenna 205 outputs the power transmission for authentication. Then, the control unit 201 performs the authentication processing. Furthermore, the control unit 201 controls the communication unit 206 to attempt the authentication by the above wireless communication (S402). After that, the control unit 201 determines whether the authentication has succeeded (S403).

When the authentication succeeds, the object detected in S401 is determined as the power reception apparatus 102. In this case, the power transmission unit 203 is controlled so that the power transmission antenna 205 outputs the power transmission for charging that is the power transmission in the power transmission phase. The power transmission for charging is performed until the communication unit 206 receives, from the power reception apparatus 102, a request for stopping the power transmission (S404). When the power transmission is stopped, the control unit 201 notifies, by the notification unit 209, the user that the charging has been completed (S405). Then, the control unit 201 controls the power transmission unit 203 so that the power transmission antenna 205 outputs the power transmission for detection. Next, the control unit 201 determines whether the placed object has been removed (S407). The processing returns to S401 when the placed object has been removed.

When the authentication fails in S402, namely the detected object is not the power reception apparatus 102, no power transmission for charging is output and the notification unit 209 notifies the user to remove the object having been placed on the charging stand 103 (S403 and S406). Next, the control unit 201 controls the power transmission unit 203 so that the power transmission antenna 205 outputs the power transmission for detection. Then, the control unit 201 determines whether the placed object has been removed (S407). When the placed object has been removed, the processing returns to S401.

The detailed description of the detection processing in S401 will be given using the flowchart in FIG. 5.

First, the control unit 201 initializes a continuous detection counter to zero (S501). The continuous detection counter counts the number of continuous detections of the object by the power transmission for detection. The value of the continuous detection counter is stored in the memory 208. Next, the control unit 201 controls the power transmission unit 203 so that the power transmission antenna 205 outputs the power transmission for detection (S502). When the output of the power transmission for detection starts, the control unit 201 confirms whether the object has been placed in the range 110 on the charging stand 103 in accordance with whether a result detected by the detection unit 204 is a value different from that in the stationary state. When the object present in the range where the power is transmitted is detected, the control unit 201 increments the continuous detection counter by one (S503 and S504). As a result, the control unit 201 determines that the object receiving the power has been continuously placed in the range 110 on the charging stand 103 for the predetermined time or more when the value of the continuous detection counter is greater than or equal to a predetermined value N, so as to complete the detection processing (S505).

The predetermined value N is used to define a predetermined period when the object continuously present, during the predetermined period, in the range where the power is transmitted, is detected. For example, in a case where a period during which the power transmission for detection is output is 100 msec, when it is detected that the object has been continuously placed for one or more seconds, N may be set to 11. The memory 208 stores the value of N. With consideration of a space of the range where the power is transmitted, the predetermined period defined by the predetermined value N is set to be longer than time during which the user holds the power reception apparatus and passes through the range where the power is transmitted. The user may arbitrarily set the predetermined value N.

In S503, when no object is detected in the range where the power is transmitted, the control unit 201 initializes the continuous detection counter to zero (S506). The control unit 201 controls the power transmission unit 203 so that the power transmission antenna 205 stops the power transmission for detection. Then, the control unit 201 holds during a certain period of time, for example, 100 msec (S507). The processing returns to S502. At S505, when the value of the continuous detection counter is less than the predetermined value N, while holding the value of the continuous detection counter, the control unit 201 controls the power transmission unit 203 so that the power transmission antenna 205 stops and holds the power transmission for detection during a certain period of time. After that, the processing is held for the predetermined time (S507) and then returns to S502.

According to the above processing, the control unit 201 intermittently outputs the power transmission for detection at the predetermined time interval to confirm whether there is an object that receives the power for each output each time. When the object that receives the power has been continuously detected during a plurality of times (more than N) of the output of the power transmission for detection, it is determined that the object has been continuously placed in the range 110 on the charging stand 103 for the predetermined time or more. Then, the processing proceeds to the next step. That is, due to each of the plurality of consecutive times of the power transmission for detection, the authentication processing can be performed just to the object that has been detected as being present in the range where the power is transmitted. Therefore, for example, even when a power reception apparatus that does not need the power transmission is temporarily present in the range where the power is transmitted as passing through the vicinity of the power transmission apparatus, the authentication processing is not performed to this power reception apparatus. As a result, processing for the unnecessary power transmission can be reduced.

Figure 6:
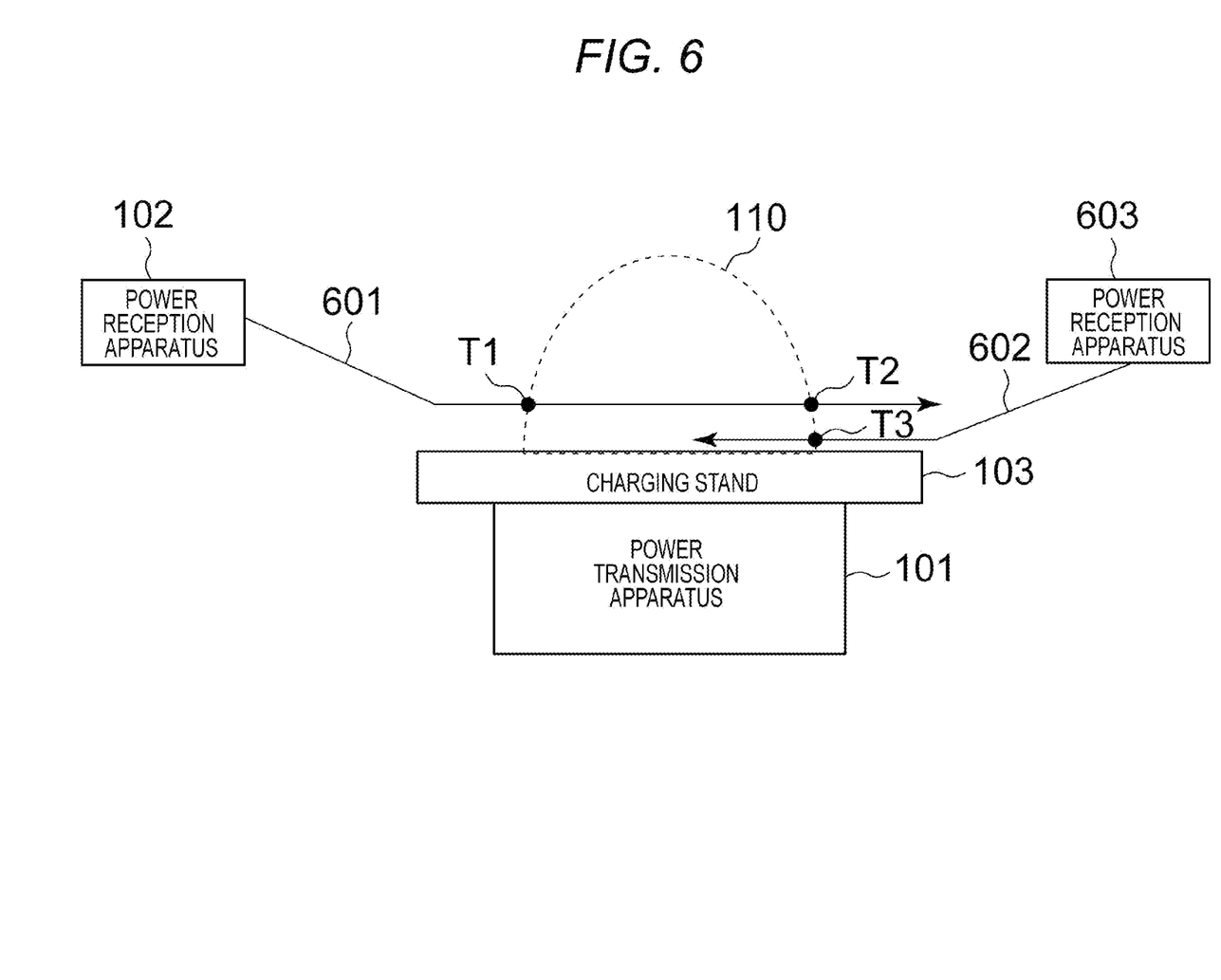
FIG. 6 is a diagram of a movement of the power reception apparatus.

Operation of the present wireless power transmission system in a case of N=3 as an example will be described using FIGS. 6 and 7. FIG. 6 is a diagram illustrating that, in accordance with a user's movement, the power reception apparatus 102 passes through the range where the power is transmitted, of the power transmission apparatus 101, and then another power reception apparatus 603 is placed at the center of the charging stand 103. The power reception apparatus 102 enters the range 110 on the charging stand 103 at time T1, and then moves out of the range 110 at time T2. Then, the power reception apparatus 603 enters the range 110 at time T3. Here, between time T1 and time T2, the power transmission for detection is output twice.

Figure 7:
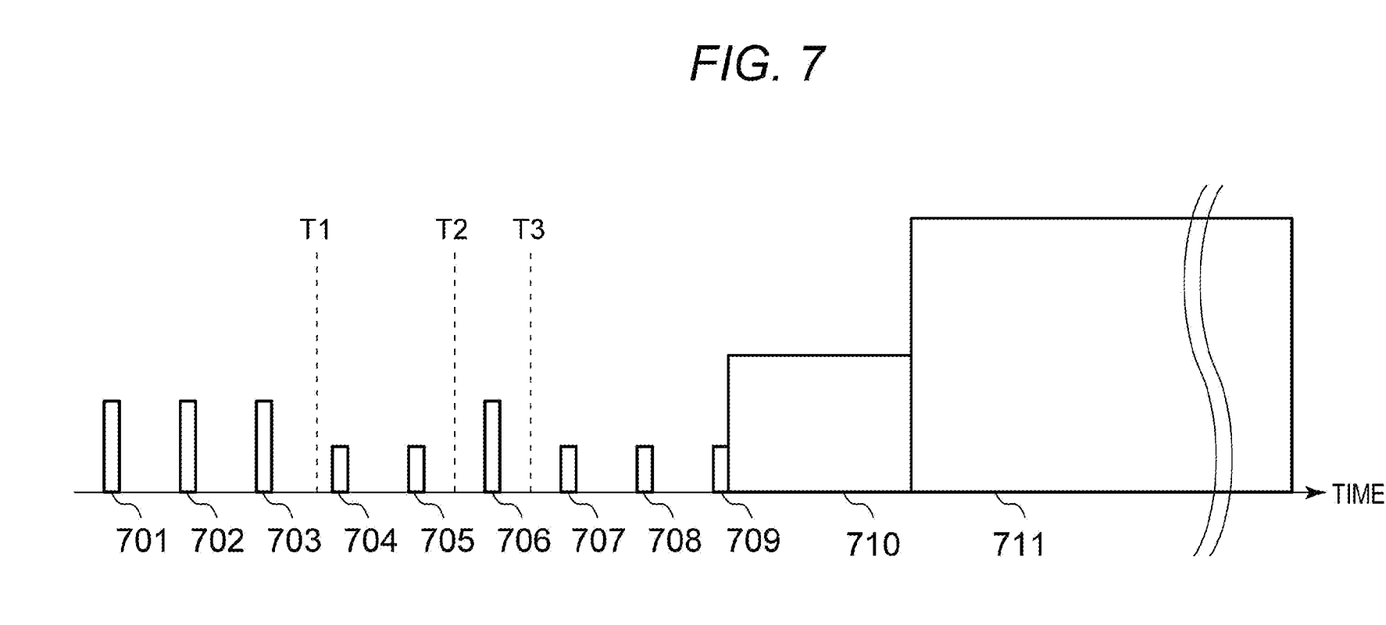
FIG. 7 is a graphical representation of a voltage detected by the power transmission apparatus.

FIG. 7 is a graphical representation of a voltage detected by the detection unit 204 in this case. The vertical axis represents a detection voltage, and the horizontal axis represents time. The power transmission apparatus 101 intermittently outputs the power transmission for detection by the processing of S401 before time T1. During this period, the detection unit 204 detects a voltage at the stationary state (701 to 703). During a period between time T1 and time T2, since the power reception apparatus 102 is present in the range 110 on the charging stand 103, the detection unit 204 detects a voltage different from the voltage at the stationary state (704 and 705). Accordingly, the control unit 201 detects placement of an object. When the power reception apparatus 102 moves out of the range 110 at time T2 after the control unit 201 detects the placement of the object due to consecutive two times of the power transmission for detection, the detection unit 204 detects the voltage at the stationary states again (706). In this case, the control unit 201 initializes the continuous detection counter to zero in S506 without selecting YES in S505 after the value of the continuous detection counter to be stored in the memory 208 increases up to two. In other words, at this stage, the power transmission for authentication caused by the processing proceeding to S402 in FIG. 4 is not performed.

The power reception apparatus 603 then enters the range 110 at time T3. Next, when the power reception apparatus 603 stays in the range 110, the detection unit 204 detects a voltage different from the voltage at the stationary state due to consecutive three times of the power transmission for detection (707 to 709). Since the continuous detection counter satisfies N=3 due to the third 709, the processing proceeds to S402 because YES is selected in S505 in FIG. 5. Therefore, the power transmission for authentication is transmitted (S402, 710). When the authentication succeeds, the power transmission for charging is transmitted (S404, 711).

As described above, according to the present embodiment, even when the power reception apparatus 102 temporarily enters, along a trace 601 illustrated in FIG. 6, the range where the power is transmitted, of the power transmission apparatus 101, the authentication processing is not performed. Therefore, the processing for unnecessary power transmission can be reduced. When the power reception apparatus 603 is placed in the range where the power is transmitted, of the power transmission apparatus 101 by following a trace 602 illustrated in FIG. 6, the authentication processing can be securely performed.

The power reception apparatus in which the battery is charged with the received power has been described above. However, the power reception apparatus may use the power received after the authentication succeeds, for other uses, such as driving of a motor.

Second Embodiment

Figure 8:
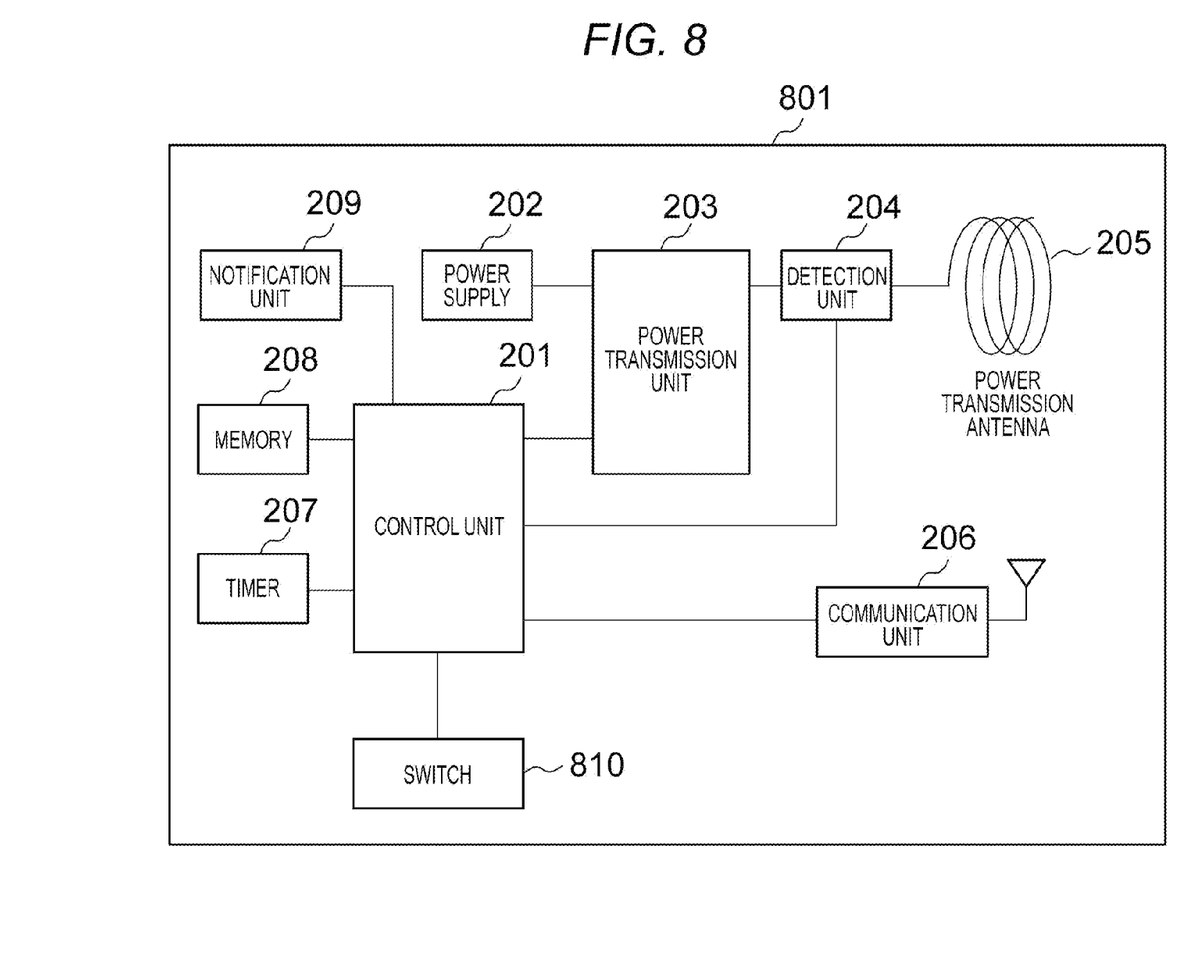
FIG. 8 is a diagram of a configuration of another power transmission apparatus.

FIG. 8 is a diagram of a configuration of a power transmission apparatus 801 in a wireless power transmission system that performs wireless power transmission according to another embodiment. The power transmission apparatus 801 according to the present embodiment has the same configuration as that of the power transmission apparatus 101 except for a switch 810. The switch 810 sets activation or inactivation for detection processing that detects an object having been continuously placed for predetermined time or more. The switch 810 can be set to two values: ON and OFF. In a case of OFF, power transmission for authentication is output and then authentication processing is performed immediately after an object is detected by single power transmission for detection. That is, in a case where the switch is set to OFF, the above predetermined value N is set to one.

Operation of the detection processing of the power transmission apparatus 801 illustrated in FIG. 5 will be described. The same processing in S501 and S502 as that in the above first embodiment is performed. At S503, the power transmission apparatus 801 detects the object to confirm whether the switch 810 is ON or OFF. When the switch 810 is ON, a control unit 201 in the power transmission apparatus 801 initializes the predetermined value N to be stored in a memory 208 to a set value. The remaining processing is the same as that in the above first embodiment, and as such, a detailed description is omitted herein. When the switch 810 is OFF, the control unit 201 in the power transmission apparatus 801 changes the predetermined value N stored in the memory 208 to one. The remaining processing is the same as that in the above first embodiment, and as such, a detailed description is omitted herein. Note that, in the case that switch 810 is OFF, in S503, when detecting the object, the power transmission apparatus 801 may complete the detection processing and the processing proceeds to S402.

With this configuration, the power transmission apparatus 801 can select either a mode that immediately executes authentication processing or a mode that reduces unnecessary authentication processing. Therefore, convenience of a user can be improved.

Other Embodiments

In the above embodiments, it has been described that the power reception apparatus is placed on the power transmission apparatus and then the wireless power transmission is performed. However, when there is a spatial distance between the power reception apparatus and the power transmission apparatus, the wireless power transmission may be performed. For example, the above embodiments can be applied to wireless power transmission in a non-contact state between an electric vehicle as the power reception apparatus and the power transmission apparatus built in a floor surface or a road surface.

In the above embodiments, it has been described that when the object is detected at each of the plurality of consecutive times of the power transmission for detection, the authentication processing is performed to the object. However, without detection of each of the plurality of consecutive times of the power transmission for detection, for example, when the object is detected every other time the power transmission for detection is performed during a predetermined period, the authentication processing may be also performed to the object. Alternatively, the authentication processing may be performed to the object detected predetermined times or more, for example, seven or more times out of ten, in the power transmission for detection during the predetermined period. Aspects of the present invention can be performed as follows. A program that implements a function or more in the above embodiments can be supplied to a system or an apparatus through a network or a recording medium, and a processor or more in a computer of the apparatus or the system reads and executes the program. Alternatively, a circuit that implements a function or more (for example, ASIC) can perform aspects of the present invention.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-249444, filed Dec. 9, 2014, which is hereby incorporated by reference herein in its entirety.

What is claimed is:

1. A power transmission apparatus comprising:
a power transmission unit configured to wirelessly transmit power;
a detection unit configured to detect, based on first power for detection transmitted by the power transmission unit, an object present in a range of the power transmission apparatus where the power is transmitted; and
a discrimination unit configured to discriminate, based on an authentication, whether the object detected by the detection unit is a power reception apparatus to which power is to be transmitted, wherein the power transmission unit transmits, to the object, second power for the authentication,
wherein the discrimination unit performs the discrimination in a case where the detection unit detects the object at each of a plurality of times of transmission of the first power, and
wherein the power transmission unit transmits third power to the object which is discriminated, by the discrimination unit, to be the power reception apparatus, to which power is to be transmitted, the third power being larger than the first power and the second power.

2. The power transmission apparatus according to claim 1, wherein the second power is for supplying power to the object detected by the detection unit, the second power being necessary for the authentication.

3. The power transmission apparatus according to claim 2, wherein the authentication fails when information necessary for the authentication is not acquired within a predetermined time after transmission of the second power starts.

4. The power transmission apparatus according to claim 3, further comprising a notification unit configured to provide a notification for removing the object present in the range where the power is transmitted when the discrimination unit discriminates that the object is not the power reception apparatus to which power is to be transmitted.

5. The power transmission apparatus according to claim 1, wherein the discrimination unit performs the discrimination based on communication with the object detected by the detection unit.

6. The power transmission apparatus according to claim 1, wherein the discrimination unit performs the discrimination in a case where the object is detected as being present in the range where the power is transmitted at each of a plurality of consecutive times of transmission of the first power.

7. The power transmission apparatus according to claim 1, wherein the detection unit detects the object present in the range where the power is transmitted based on a predetermined detection value upon transmission of the first power.

8. The power transmission apparatus according to claim 7, wherein the predetermined detection value is any one of a power value, a voltage value, or a current value.

9. The power transmission apparatus according to claim 1, further comprising a switch unit configured to switch performance of the discrimination by the discrimination unit between to the object detected as being present in the range where the power is transmitted at each of the plurality of times of transmission of the first power and to an object detected as being present in the range where the power is transmitted with a one-time transmission of the first power.

10. A method for controlling a power transmission apparatus that includes a power transmission unit configured to wirelessly transmit power, the method comprising:
  detecting, based on first power for detection transmitted by the power transmission unit, an object present in a range of the power transmission apparatus where the power is transmitted; and
  discriminating, based on an authentication, whether the detected object is a power reception apparatus to which power is to be transmitted, wherein the power transmission unit transmits, to the object, second power for the authentication,
  wherein the discriminating is performed in a case where the object is detected at each of a plurality of times of transmission of the first power, and
  wherein third power is transmitted to the object which is discriminated, by the discrimination unit, to be the power reception apparatus, to which power is to be transmitted, the third power being larger than the first power and the second power.

11. A non-transitory computer-readable storage medium storing computer-executable instructions for a causing a power transmission apparatus that includes a power transmission unit to execute a method to wirelessly transmit power, the method comprising:
  detecting, based on first power for detection transmitted by the power transmission unit, an object present in a range of the power transmission apparatus where the power is transmitted; and
  discriminating, based on an authentication, whether the detected object is a power reception apparatus to which power is to be transmitted, wherein the power transmission unit transmits, to the object, second power for the authentication,
  wherein the discriminating is performed in a case where the object is detected at each of a plurality of times of transmission of the first power, and
  wherein third power is transmitted to the object which is discriminated, by the discrimination unit, to be the power reception apparatus, to which power is to be transmitted, the third power being larger than the first power and the second power.

\* \* \* \* \*